United States Patent [19]
Katz

[11] Patent Number: 5,164,861
[45] Date of Patent: Nov. 17, 1992

[54] MIRROR AND HINGE MEANS FOR PIVOTALLY MOUNTING SAID MIRROR TO A GENERALLY PLANAR SURFACE

[75] Inventor: Howard S. Katz, Riegelsville, Pa.

[73] Assignee: Robern, Inc., Bensalem, Pa.

[21] Appl. No.: 511,378

[22] Filed: Apr. 18, 1990

[51] Int. Cl.⁵ .................... G02B 7/18; A47B 67/00
[52] U.S. Cl. ................................. 359/872; 312/227
[58] Field of Search ............... 312/224, 225, 226, 227, 312/245; 350/632; 359/872

[56] References Cited

U.S. PATENT DOCUMENTS

| | | | |
|---|---|---|---|
| 1,006,481 | 10/1911 | Bartz | 312/227 |
| 1,062,962 | 5/1913 | Gaal | 312/227 |
| 1,284,492 | 11/1918 | Thomas | 312/227 |
| 2,199,731 | 5/1940 | Pryne | 312/227 |
| 2,265,565 | 12/1941 | Lemmerhirt et al. | 312/226 |
| 2,678,252 | 5/1954 | Swearingen | 312/227 |

FOREIGN PATENT DOCUMENTS 971197  9/1964  United Kingdom ................ 312/227

Primary Examiner—Bruce Y. Arnold
Assistant Examiner—R. D. Shafer
Attorney, Agent, or Firm—Panitch, Schwarze, Jacobs & Nadel

[57] ABSTRACT

A mirror is pivotally mounted to an interior surface of a cabinet door. The mirror has a first reflective surface and a second surface. A hinge interconnects the second surface of the mirror and the interior surface of the cabinet door for allowing the mirror to pivot with respect to the interior surface between a first position wherein the second surface of the mirror is positioned proximate the cabinet door interior surface and a second position wherein the second surface of the mirror is positioned away from the cabinet door interior surface. When the mirror is in the first position the cabinet door can be closed to place the mirror out of view from the exterior of the cabinet and when the cabinet door and the mirror are in the second or open position, the mirror is positionable such that the mirror can be squarely viewed from the exterior of the cabinet.

6 Claims, 4 Drawing Sheets

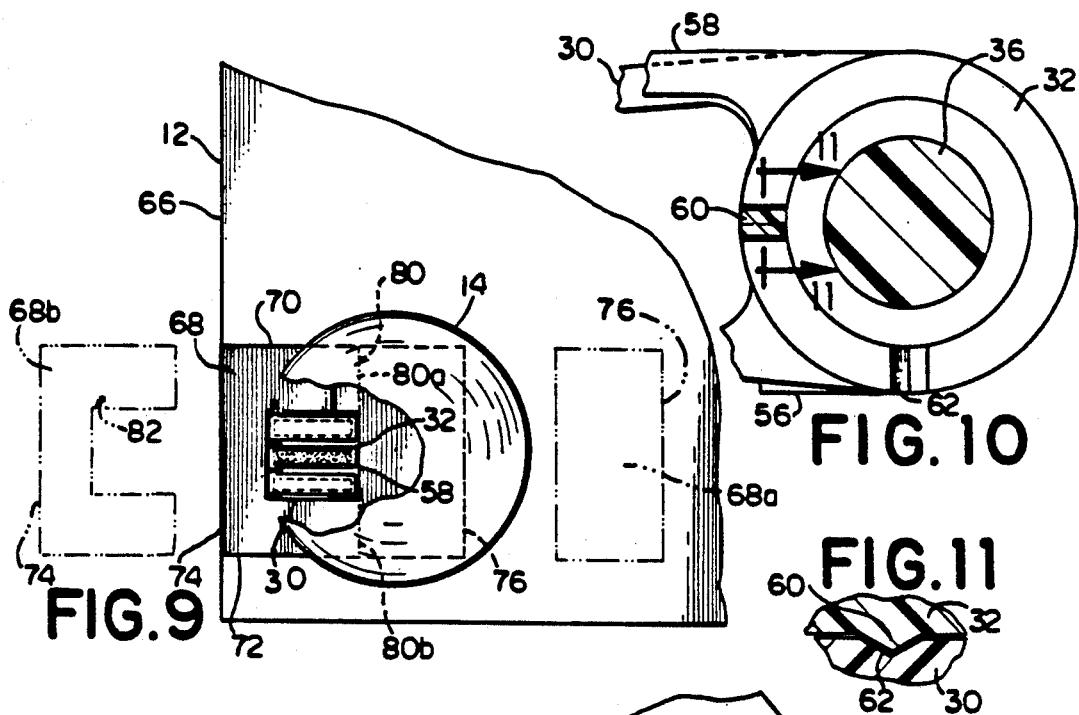
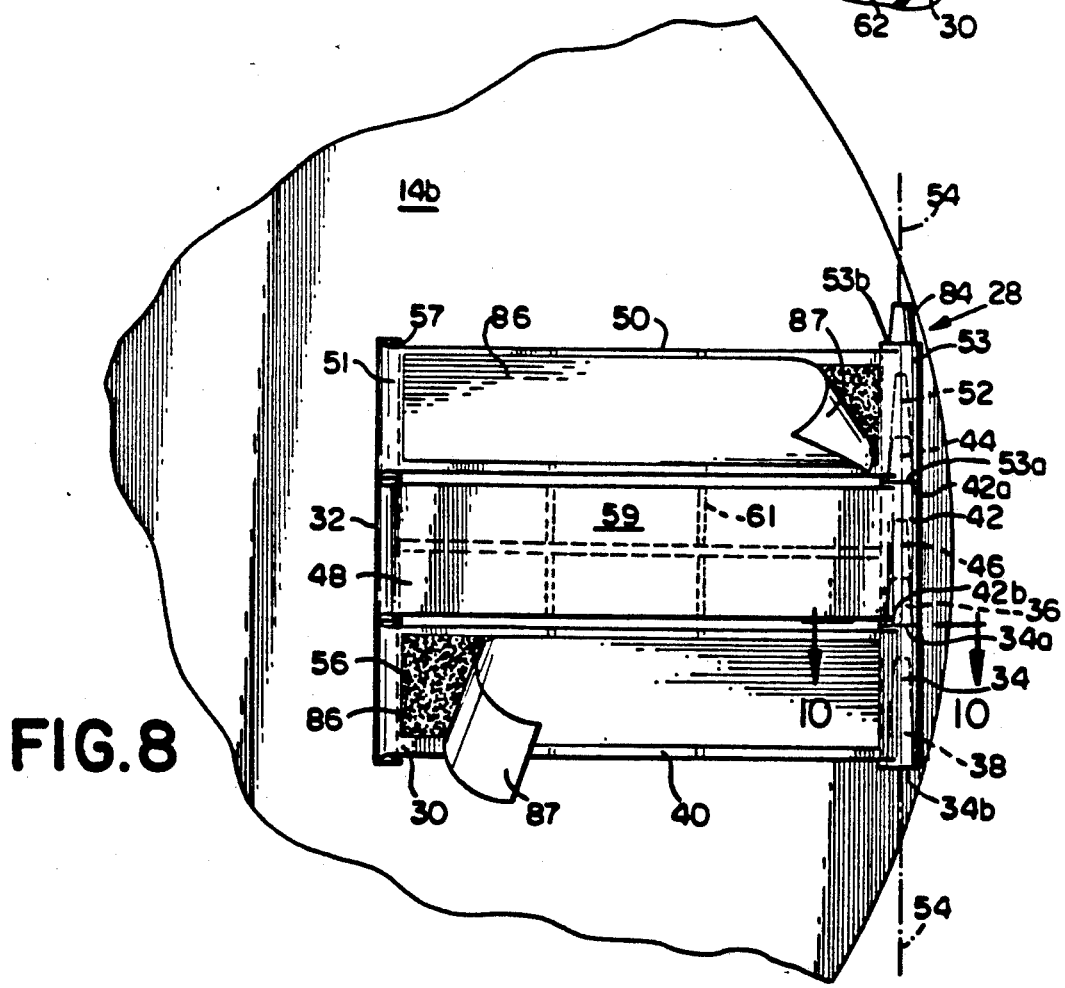

MIRROR AND HINGE MEANS FOR PIVOTALLY MOUNTING SAID MIRROR TO A GENERALLY PLANAR SURFACE

FIELD OF THE INVENTION

The present invention relates to a method and apparatus for mounting a mirror to a generally planar surface and, more particularly, to a mirror and hinge means for pivotally mounting the mirror to a generally planar interior surface of a cabinet door and a method of aligning and pivotally mounting the mirror on the interior surface.

BACKGROUND OF THE INVENTION

It is well known to construct bath cabinets with a mirrored cabinet door pivotally mounted to the cabinet. It is further known to secure an auxiliary mirror (e.g., a make-up or magnifying mirror) to an interior surface of the cabinet door. That is, the mirrored cabinet door and the auxiliary mirror are mounted back to back in facing relationship such that when the cabinet door is in the closed position, the auxiliary mirror is within the cabinet and out of view. By positioning the auxiliary mirror within the cabinet the outer appearance of the cabinet is not marred.

The above-described cabinet door and auxiliary mirror mounting arrangement is problematic, in that, in order to position the auxiliary mirror so that it squarely faces the user, the cabinet door must be able to open 180°. However, for a variety of reasons, the cabinet door may not be able to open 180°. For instance, the type of hinge used may limit the range of pivotal motion or the cabinet may be mounted in a location such that the structure of the room will limit the range of pivotal motion (e.g. in the corner of a room). Thus, the user would have to strain in order to squarely view the auxiliary mirror. Moreover, even where a cabinet door can pivot 180°, the auxiliary mirror is positioned far from the user because such cabinets are normally mounted over a sink or vanity. This causes the user to strain over the sink or vanity to get close to the mirror.

The present invention provides a mirror and a hinge for pivotally mounting the mirror to a generally planar interior surface of a cabinet door. The present invention further provides a hinge for mounting the mirror to the interior surface of the cabinet door which can be affixed to the mirror and interior surface without the need for standard hardware and without penetrating or modifying the mirror or interior surface. The present invention further provides a template for aligning and mounting the mirror on the interior surface such that the mirror is positioned at a desired height and pivots in a horizontal plane.

SUMMARY OF THE INVENTION

Briefly stated, the present invention is a mirror and hinge means for pivotally mounting the mirror to a generally planar surface. The mirror has a reflective first surface and a second surface for being mounted to a generally planar surface. The hinge means comprises a first hinge member including a pivot boss having a first surface and a second surface. The pivot boss first surface includes a peg extending generally perpendicularly therefrom. The pivot boss second surface includes a bore extending therethrough into the pivot boss. The first hinge member further includes a mounting leaf extending from the pivot boss for being secured to the planar surface. A second hinge member is provided and includes a pivot boss having a first surface and a second surface. The pivot boss first surface includes a peg extending generally perpendicularly therefrom. The pivot boss second surface includes a bore extending therethrough into the pivot boss. The second hinge member further includes a mounting leaf extending from the pivot boss for being secured to the second surface. The peg of the first hinge member is sized to generally complement the bore of the second hinge member. The peg of the first hinge member is rotatably positioned within the bore of the second hinge member for pivotally mounting the mirror on the planar surface.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment which is presently preferred, it being understood, however, that the invention is not limited to the specific methods and instrumentalities disclosed. In the drawings:

FIG. 8 is a greatly enlarged partial elevational view of the mirror and hinge of FIG. 7 taken along line 8—8 of FIG. 7;

FIG. 9 is a broken away partial elevational view showing the template, mirror and cabinet door in alignment;

FIG. 10 is a greatly enlarged partial cross-sectional view of the hinge shown in FIG. 8 taken along line 10—10 of FIG. 8.; and FIG. 11 is a greatly enlarged partial cross-sectional view of the hinge of FIG. 10 taken along line 11—11 of FIG. 10.

DESCRIPTION OF THE PREFERRED EMBODIMENT

Figure 1:
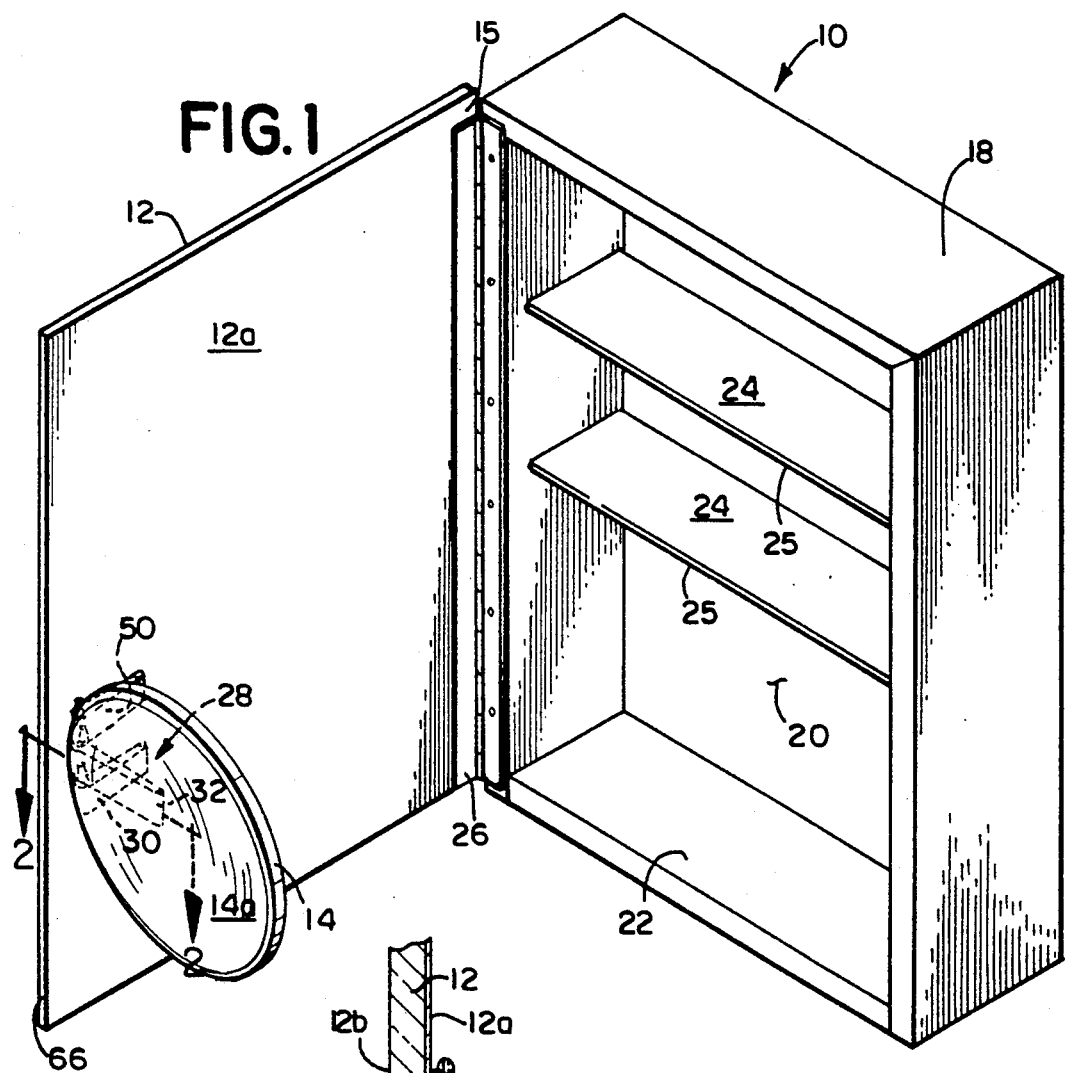
FIG. 1 is a top perspective view of a cabinet having a cabinet door and a mirror pivotally mounted to an interior surface of the door in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the cabinet, and designated parts thereof. The terminology includes the words above specifically mentioned, derivatives thereof and words of similar import.

Referring now to the drawings in detail, wherein like numerals indicate like elements throughout, there is shown in FIGS. 1–11, a preferred embodiment of a mirror and hinge means for pivotally mounting the mirror to a generally planar surface in accordance with the present invention shown in both the mounted and unmounted positions.

FIG. 1 perspectively illustrates a cabinet 10 having a cabinet door 12 and a mirror 14 pivotally mounted to the cabinet door 12. The cabinet 10 includes a cabinet body 18 having an internal storage area 20 for receiving items to be stored (not shown) and an opening 22 for accessing the storage area 20. A pair of shelves 24 are positioned within the storage area 20 of the cabinet body 18 for receiving the items to be stored. The cabinet door 12 is pivotally mounted to the cabinet body 18 and includes an interior surface 12a and a reflective exterior surface 12b, such as a mirror. In the present embodiment, it is preferred that the cabinet door 12 and the interior surface 12a be generally planar.

Figure 3:
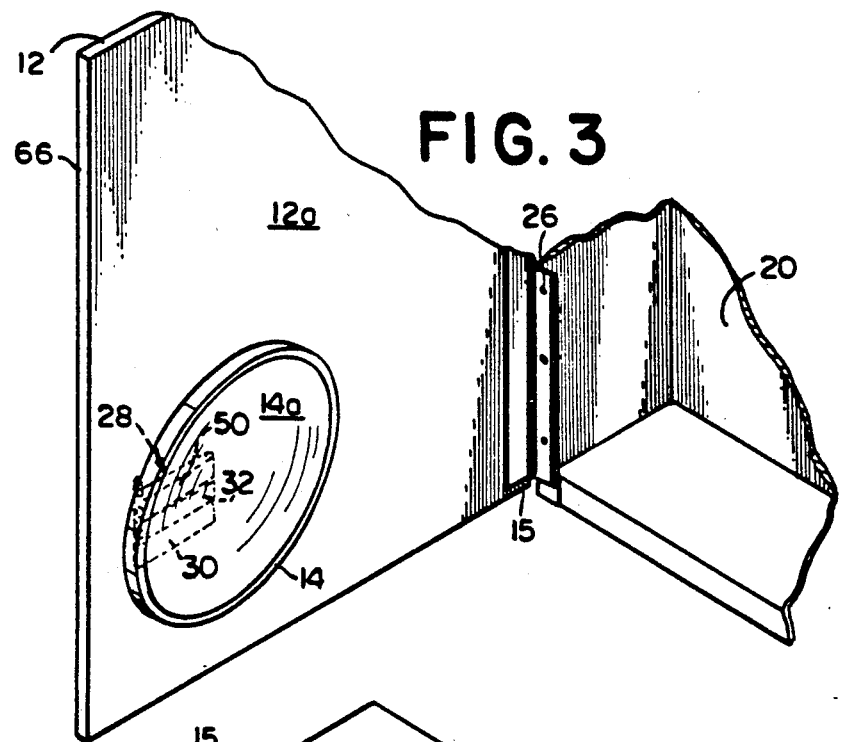
FIG. 3 is a partial perspective view of the cabinet of FIG. 1 showing the mirror positioned proximate the cabinet door.

As shown in FIGS. 1 and 3, a first hinge means is interconnected between the cabinet door 12 and the cabinet body 18 for allowing the cabinet door 12 to pivot with respect to the cabinet body 18 between a first position (shown in FIG. 4) wherein the cabinet door 12 is closed or positioned proximate the opening 22 and a second position (shown in FIG. 1) wherein the cabinet door 12 is open or positioned away from the opening 22, as is understood by those skilled in the art. In the present embodiment, it is preferred that the first hinge means be comprised of a longitudinally extending cabinet hinge 26 positioned along and interconnected between a proximal edge 15 of the cabinet door 12 on the interior surface 12a and the cabinet body 18. However, it is understood by those skilled in the art, that a plurality of hinges (not shown) could be interconnected between the cabinet door 12 and cabinet body 18 for allowing the cabinet door 12 to pivot with respect to the cabinet body 18.

It is understood by those skilled in the art, that the present invention is not limited to any specific type, shape or size cabinet and that the cabinet 10 can be surface or recess mounted. That is, the cabinet 10 is of the type which is known to those skilled in the art, and therefore, further description thereof is omitted for convenience only, and is not limiting. However, it is preferred that the present invention be used in conjunction with a bath-type cabinet wherein the exterior surface 12b of the cabinet door 12 is a mirror.

Figure 2:
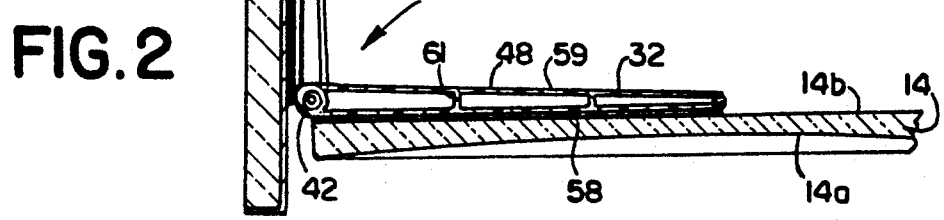
FIG. 2 is an enlarged cross-sectional view of the cabinet door and mirror of FIG. 1 taken along line 2—2 of FIG. 1.

As shown in FIGS. 1–5, the mirror 14 is pivotally mounted to the interior surface 12a of the cabinet door 12. The mirror includes a reflective first surface 14a and a second surface 14b. In the present embodiment, it is preferred that the reflective first surface 14a be generally concave shaped for providing a magnified reflection, such as that typically used in make-up mirrors and that the second surface 14b be generally planar, as shown in FIG. 2. However, it is understood by those skilled in the art, that the first and second surfaces 14a and 14b could be of other geometrical shapes, for instance the first surface 14a could be generally planar and/or that the second surface 14b could be generally convex to complement the concave first surface 14b.

Figure 4:
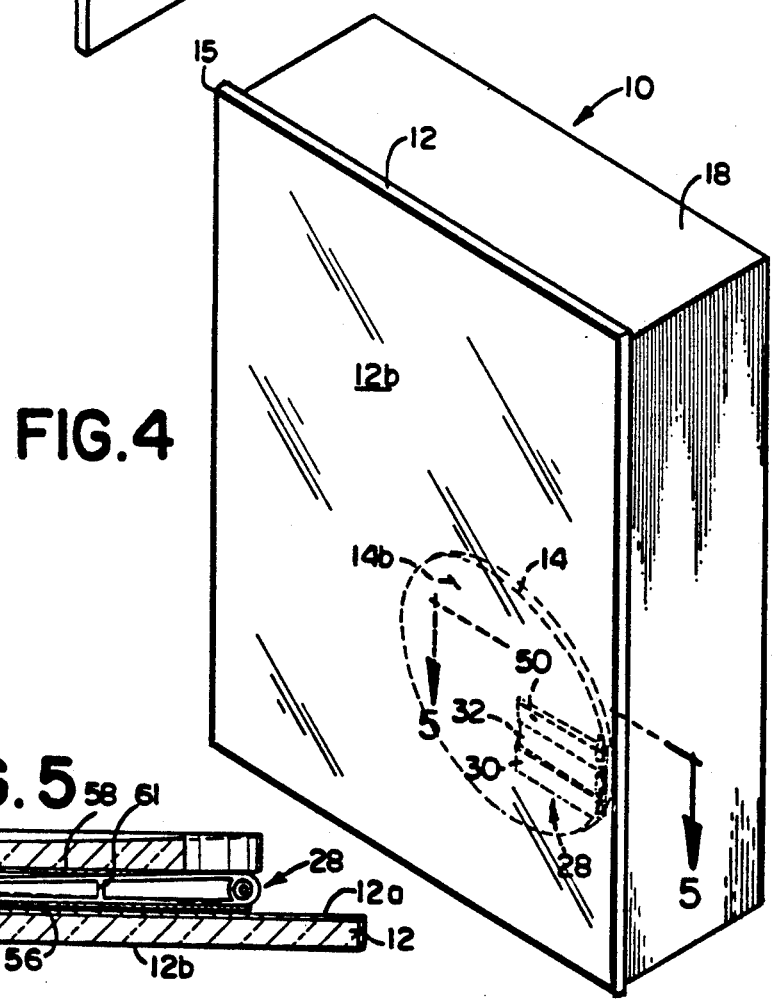
FIG. 4 is a top perspective view of the cabinet of FIG. 1 showing the mirror and cabinet door in a closed position.

In the present embodiment, it is preferred that the mirror 14 be generally circular shaped, as shown in FIG. 9. However, it is understood by those skilled in the art that the mirror 14 can be of other shapes and configurations, such as square or oval. The mirror 14 preferably has maximum thickness which allows it to be positioned between a front edge 25 of the shelves 24 and the interior surface 12a of the cabinet door 12 so that the door 12 fully closes, as shown in FIG. 4.

In the present embodiment, it is preferred that the mirror 14 be constructed of a refractory material, such as glass. However, it is understood by those skilled in the art that the mirror could be constructed of any suitable material which is capable of reflecting sufficient undiffused light to form a virtual or magnified virtual image of an object placed in front of it.

As shown in FIGS. 1–3, a second hinge means is interconnected between the mirror 14 and the interior surface 12a of the cabinet door 12 for allowing the mirror 14 to pivot with respect to the interior surface 12a. The mirror 14 pivots between a first position (shown in FIG. 3) wherein the second surface 14b of the mirror 14 is positioned proximate the cabinet door interior surface 12a or in facing relationship therewith and a second position (shown in FIG. 1) wherein the second surface 14b of the mirror 14 is positioned away from the cabinet door interior surface 12a. Thus, as shown in FIG. 4, when the cabinet door 12 and the mirror 14 are in the first position, the mirror 14 is out of view from the exterior of the cabinet 10 and when the cabinet door 12 and the mirror 14 are in the second position (see FIG. 1), the mirror is positionable such that the mirror 14 can be squarely viewed from the exterior of the cabinet 10.

As shown in FIG. 1, in the present embodiment, it is preferred that the cabinet door 12 be positioned transversely to the opening 22 of the cabinet body 18 and the mirror 14 be transversely positioned with respect to the cabinet door 12 when the mirror 14 and cabinet door 12 are in the second position. In this second position, the mirror 14 is readily viewable by the user so that personal duties (e.g., applying or removing make-up or inserting or removing contact lenses) can be readily accomplished.

However, it is understood by those skilled in the art, that the mirror 14 and cabinet door 12 can be positioned at other relative positions and still allow the user to squarely view the mirror 14. That is, so long as the angle formed between the interior surface 12a and the opening 22, and the angle formed between the second surface 14b of the mirror 14 and the interior surface 12a add up to approximately 180°, the user can squarely view the mirror 14 if the user is squarely facing the opening 22.

Referring now to FIGS. 1, 2 and 8, in the present embodiment, it is preferred that the second hinge means for pivotally mounting the mirror 14 to the generally planar interior surface 12a of the cabinet door 12 be comprised of a mirror hinge 28. The mirror hinge 28 preferably includes a first hinge member 30 secured to the cabinet door interior surface 12a and a second hinge member 32 secured to the second surface 14b of the mirror 14. In the present embodiment, it is preferred that the first hinge member 30 be adhesively secured to the cabinet door interior surface 12a and the second hinge member 32 be adhesively secured to the second surface 14b of the mirror 14, as described in more detail hereinafter.

As best shown in FIG. 8, the first and second hinge members 30, 32 include cooperating pivot means for allowing the first hinge member 30 to pivot with respect to the second hinge member 32. In the present embodiment, it is preferred that the cooperating pivot means be comprised of cooperating members on the first and second hinge members 30, 32, as described below.

Referring now to FIG. 8, the first hinge member 30 includes a pivot boss 34 having a first surface 34a and a second surface 34b. The pivot boss 34 is preferably generally cylindrically shaped, as shown in FIGS. 8 and 10. The pivot boss first surface 34a includes a peg 36 extending generally perpendicularly therefrom. The pivot boss second surface 34b includes a bore 38 extending therethrough into the pivot boss 34. The first hinge member 30 further includes a mounting leaf 40 extending from the pivot boss 34 for being secured to the generally planar interior surface 12a of the cabinet door 12.

The second hinge member 32 includes a pivot boss 42 having a first surface 42a and a second surface 42b. It is preferred that the pivot boss 42 be generally cylindrically shaped. The pivot boss first surface 42a includes a peg 44 extending generally perpendicularly therefrom. The pivot boss second surface 42b includes a bore 46 extending therethrough into the pivot boss 42. The second hinge member 32 further includes a mounting leaf 48 extending from the pivot boss 42 for being secured to the second surface 14b of the mirror 14.

Referring now to FIG. 8, in the present embodiment, it is preferred that the peg 36 of the first hinge member 30 be sized to generally complement the bore 46 of the second hinge member 32. The peg 36 of the first hinge member 30 is rotatably positioned within the bore 46 of the second hinge member 32 for pivotally mounting the mirror 14 on the planar interior surface 12a of the cabinet door 12. It is further preferred that the first surface 34a of the pivot boss 34 of the first hinge member 30 be in sliding engagement with the second surface 42b of the pivot boss 42 of the second hinge member 32, as shown in FIG. 8.

While the above described embodiment of the mirror hinge 28 includes a first hinge member 30 and a second hinge member 32, it is understood by those skilled in the art, that a plurality of generally identical hinge members could be utilized to mount the mirror 14 to the cabinet door 12, without departing from the spirit and scope of the invention. For instance, as shown in FIG. 8, the mirror hinge 28 further includes a third hinge member 50 generally identical to the first hinge member 30. The peg 44 of the second hinge member 32 is rotatably positioned within the bore 52 of the third hinge member 50 to thereby securely sandwich the second hinge member 32 between the first and third hinge members 30 and 50. Moreover, the mounting leaf 51 of the third hinge member 50 is secured to the cabinet door interior surface 12a.

In the present embodiment, it is preferred that the bore and peg of each of the first, second, and third hinge members 30, 32, 50 have a longitudinal axis 54 such that when the hinge members are complementary mounted, the longitudinal axes of the bore and peg of each of the first, second, and third hinge members 30, 32, 50 are generally aligned. It is further preferred that the bore and peg of the first, second, and third hinge members 30, 32, 50 be generally frustoconically shaped to facilitate mounting of the hinge members with respect to each other. However, it is understood by those skilled in the art, that the first and second hinge members 30, 32, 50 could each have a bore and peg of a different configuration, such as generally cylindrical, so long as the configuration allows the first and second hinge members 30, 32 to rotate or pivot with respect to each other.

Referring now to FIGS. 2 and 8, in the present embodiment, it is preferred that the mounting leaves 40 and 51 of the first and third hinge members 30 and 50 include a mounting surface 56 and 57, respectively, for being secured to the planar interior surface 12a of the cabinet door 12. The mounting surfaces 56 and 57 of the first and third hinge member mounting leaves 40 and 51, preferably extend generally tangentially from the first and third hinge member pivot bosses 34 and 53, as best shown in FIG. 10. Similarly, it is preferred that the mounting leaf 48 of the second hinge member 32 include a mounting surface 58 for being secured to the second surface 14b of the mirror 14. The mounting surface 58 of the second hinge member mounting leaf 48 preferably extends generally tangentially from the second hinge member pivot boss 42, as best shown in FIG. 10.

Figure 5:
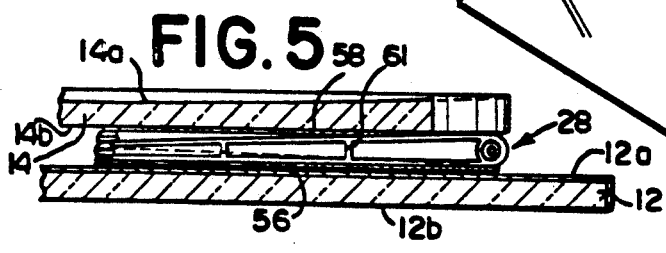
FIG. 5 is an enlarged cross-sectional view of the mirror and cabinet door of FIG. 4 taken along line 5—5 of FIG. 4.

As shown in FIGS. 2, 5 and 11, each of the hinge members 30, 32 and 50 include a support surface 59 positioned opposite the mounting surface of each hinge member with support ribs 61 extending therebetween. The support ribs 61 and the support surface 59 combine to provide each of the hinge members 30, 32 and 50 with structural integrity. However, it is understood by those skilled in the art, that each of the hinge members 30, 32 and 50 could be solidly constructed without the use of ribs, much like a standard door hinge.

Referring now to FIGS. 8 and 9, as mentioned above, it is preferred that the mounting surfaces 56 and 57 of the first and third hinge members 30 and 50 be adhesively secured to the interior surface 12a and the mounting surface 58 of the second hinge member 32 be adhesively secured to the second surface 14b of the mirror 14. In the present embodiment, it is preferred that the mounting surfaces 56, 57 and 58 be adhesively secured by double-back tape 86. The double-back tape 86 preferably includes backing 87 which is peeled away when the respective mounting surface is ready to be mounted, as is understood by those skilled in the art. However, it is also understood by those skilled in the art, that the mounting leafs 40, 48 and 51 of the first, second and third hinge members 30, 32 and 50 can be secured to the desired planar surface by other securing means, such as epoxy or standard hardware. For example, where the cabinet door 12 is not mirrored, it is understood that the mounting leaf 48 of the second hinge member 32 could be secured to the cabinet door by standard hardware, such as screws.

Referring now to FIGS. 10 and 11, the first, second and third hinge members 30, 32 and 50 include at least one detent member 60 extending radially from the longitudinal axis 54 and downwardly from the second surface 34b, 42b and 53b thereof and at least one corresponding detent notch 62 in the first surface 34a, 42a and 52a of the first, second and third hinge members 30, 32 and 50, respectively. Thus, when the detent member 60 is in engagement with the detent notch 62 the first, second and third hinge members 30, 32 and 50 are in a semi-locked position.

In the present embodiment, it is preferred that the second surface 34b, 42b and 53b of the first, second and third hinge members 30, 32 and 50 include a single radially extending detent member 60 and the first surface 34a, 42a and 53a of the first, second and third hinge members 30, 32 and 50 include at least two radially extending corresponding detent notches 62 positioned 90 degrees from each other for defining the first and second positions of the mirror 14.

However, it is understood by those skilled in the art, that the detent member 60 could be positioned on the first surface 34a, 42a and 53a of the first, second and third hinge members 30, 32 and 50 and that the detent notches 62 could be positioned in the second surface 34b, 42b and 53b of the first, second and third hinge members 30, 32 and 50, without departing from the spirit and scope of the invention. It is similarly understood that the hinge members could include a plurality of detent notches 62 for defining a plurality of semi-locked positions, as is understood by those skilled in the art.

In the present embodiment, it is preferred that the hinge members of the mirror hinge 28 be constructed of a polymeric material, such as nylon. However, it is understood by those skilled in the art, that the hinge members 30, 32 and 50 could be constructed of other high strength lightweight materials, such as brass or aluminum, without departing from the spirit and scope of the invention. It is preferred that the hinge members 30, 32 and 50 be constructed of an injection mold process, as is understood by those skilled in the art.

Figure 6:
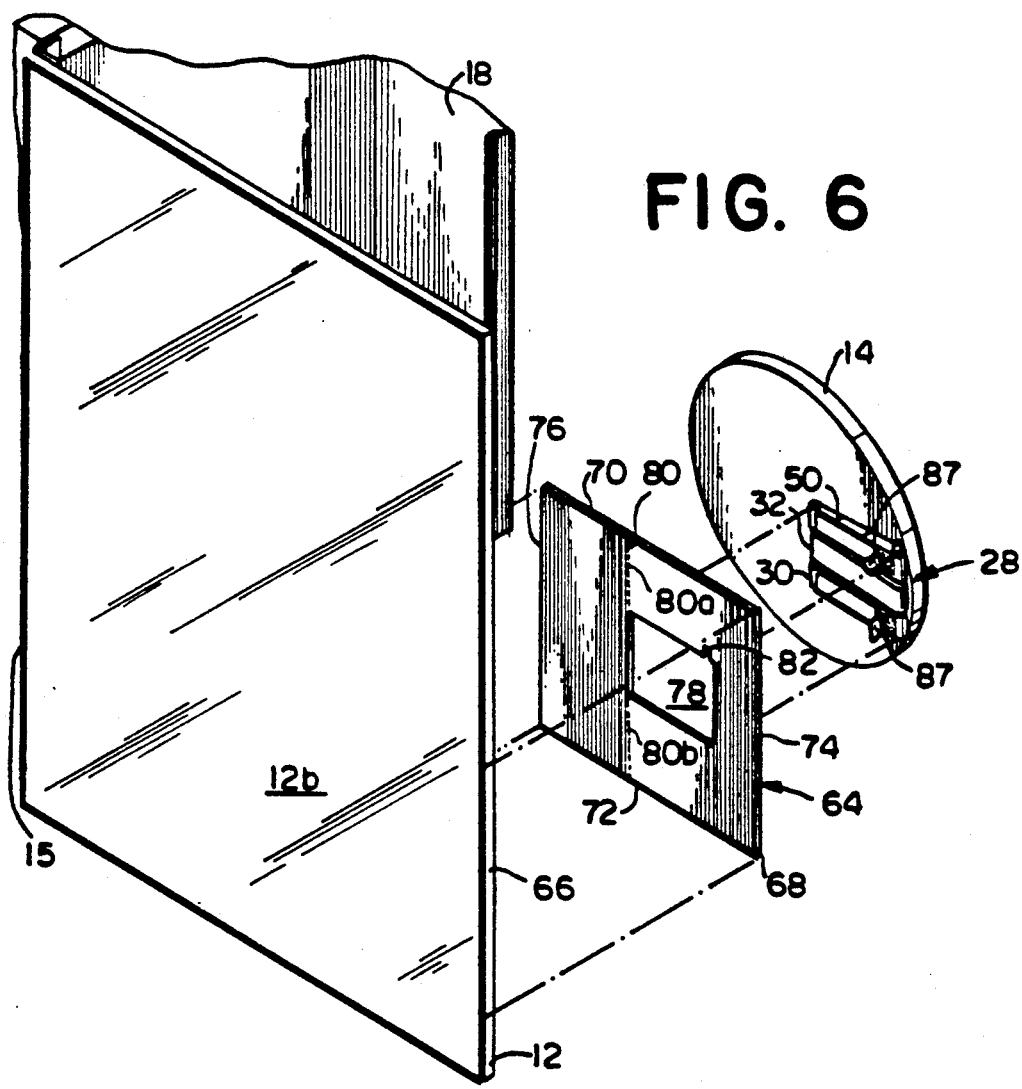
FIG. 6 is an exploded partial perspective view of the mirror and cabinet of FIG. 1 and an aligning template for aligning and mounting the mirror on the cabinet door.
Figure 7:
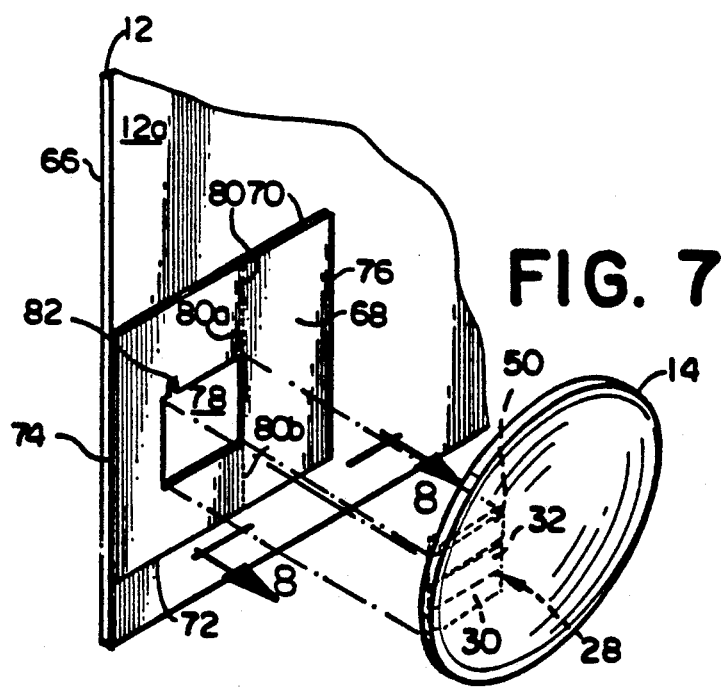
FIG. 7 is an exploded partial perspective view of the aligning template in alignment with the cabinet door of FIG. 6.

Referring now to FIGS. 6, 7 and 9, there is shown an aligning template 64 for aligning and mounting the mirror 14 on the cabinet door 12. As mentioned above, the cabinet door 12 includes a interior surface 12a which serves as a generally planar mounting surface. The cabinet door 12 further includes a linear distal edge 66 positioned opposite from the proximal edge 15 which receives the cabinet hinge 26. The mirror 14 and mirror hinge 28 are first secured together with the second hinge member 32 secured to the second surface 14b of the mirror 14 prior to using the template 64, as described in more detail below. As best shown in FIG. 8, the mirror hinge 28 has a predetermined periphery. The first and third hinge members 30 and 50, are preferably mounted for horizontal pivotal movement with respect to the second hinge member 32.

The template 64, as shown in FIG. 6, is comprised of an aligning panel 68 having a top edge 70, a bottom edge 72, a first side edge 74, and a second side edge 76. The first side edge 74 is preferably generally linear for alignment with the linear edge 66 of the cabinet door 12.

As shown in FIG. 6, an opening 78 extends through the panel 68 and is shaped to complement the periphery of the mirror hinge 28 for receiving the mirror hinge 28 therethrough. The opening 78 holds the mirror hinge 28 in the assembled position, otherwise the first hinge member 30 may disconnect from the second hinge member 32 due to gravity. The opening 78 is positioned on the panel 68 in a predetermined relationship with the first side edge 74 such that when the mirror hinge 28 is positioned within the opening 78, and the first side edge 74 is aligned with the linear edge 66 of the cabinet door 12, the mirror 14 is aligned and can be secured to the cabinet door 12 such that the mirror 14 pivots in a generally horizontal plane.

As best shown in FIG. 6, in the present embodiment, it is preferred that the panel 68 include at least one perforation 80 extending between the top edge 70 and the bottom edge 72. The perforation 80 is preferably comprised of a first perforation 80a extending between the top edge 70 and the opening 78 and a second perforation 80b extending between the bottom edge 72 and the opening 78 for separating the panel 68 into two separate pieces 68a and 68b, as described hereinafter.

While it is preferred that the perforation 80 extend between the top edge 70 and the bottom edge 72, it is understood by those skilled in the art, that the perforation 80 can extend between any two of the edges 70, 72, 74 or 76, without departing from the spirit and scope of the invention.

In the present embodiment, it is preferred that the panel 68 be of sufficient thickness so that at least the mounting surface 58 of the second hinge member 32 extends completely therethrough. It is further preferred that the opening 78 include a notch 82 for receiving the peg 84 of the third hinge member 50 therein to affirmatively align the panel 68 on the second surface 14b of the mirror 14.

In the present embodiment, it is preferred that the panel 68 be constructed of a semisoft tearable material, such as cardboard, so that the perforations 80a, 80b provide means for readily separating the panel 68 into two separate pieces, as shown in FIG. 9. However, it is understood by those skilled in the art, that the panel 68 could be constructed of other materials, such as a polymeric material, without departing from the spirit and scope of the invention. It is further understood by those skilled in the art, that the panel 68 can assume other configurations for the purposes of aligning the mirror 14 on the cabinet door 12. For instance, the panel 68 could be generally U-shaped (not shown) for receiving the mirror hinge 28 between the legs of the U-shaped panel to thereby obviate the need for perforations. It is further understood, that the first side edge 74 could be of other one-dimensional configurations to correspondingly match the distal edge of the cabinet door 12.

To align and pivotally mount the mirror 14 on the interior surface 12a of the cabinet door, the desired height of the mirror 14 with respect to the floor or ground level is first selected. The template 64 is then positioned and aligned on the second surface 14b of the mirror 14 such that at least the mounting surfaces 56 and 57 of the first and third hinge members 30 and 50 are exposed through the panel 68 in a predetermined relationship with respect to the side edge 74 of the template 64. That is, the mirror hinge 28 is positioned within the complementary opening 78 in the template 64, as shown in FIG. 9. The backing 87 is then removed from the double-back tape 86 on the first and third hinge members 30 and 50.

The template 64 is then positioned between the interior surface 12a of the cabinet door 12 and the second surface 14b of the mirror 14. The template 64 is then aligned on the interior surface 12a in a predetermined orientation. Specifically, the template 64 is aligned such that the linear edge 66 of the cabinet door 12 is in alignment with the linear edge or first side edge 74 of the template 64, as shown in FIG. 9.

The mirror 14 is then pressed against the interior surface 12a to secure the first and third hinge members 30 and 50 to the planar mounting surface or interior surface 12a of the cabinet door 12 with the double-back tape 86.

Once the first and third hinge members 30 and 50 are secured to the interior surface 12a, the template 64 is removed from between the interior surface 12a and the mirror 14 such that the mirror 14 is aligned and pivotally mounted on the cabinet door 12. That is, the mirror 14 is mounted for horizontal pivotal motion between the first and second positions, described above. To remove the template 64 from between the cabinet door 12 and mirror 14, the template 64 is separated into two pieces 68a and 68b along the perforations 80a and 80b, as shown in FIG. 9.

Alternatively, it is understood by those skilled in the art, that the mirror 14 can be hingedly secured to the cabinet door 12 by first aligning the template 64 on the cabinet door 12 and then positioning the mirror hinge 28 through the opening 78 after the backing 87 has been removed, as shown in FIG. 7.

While the above described embodiment of the invention is described such that the first and third hinge members 30 and 50 are secured to the interior surface 12a and the second hinge member 32 is secured to the second surface 14b of the mirror 14, it is understood that the various hinge members can be secured to either the interior surface 12a or the second surface 14b in any desired manner as long as the mirror 14 is mounted on the cabinet door 12.

From the foregoing description, it can be seen that the present invention comprises a mirror and hinge for pivotally mounting the mirror to a generally planar surface and method of aligning and mounting the same. It is recognized by those skilled in the art, that changes may be made to the above-described embodiment of the invention without departing from the broad inventive concept thereof. It is understood, therefore, that this invention is not limited to the particular embodiment disclosed, but is intended to cover all modifications which are within the spirit and scope of the invention as defined by the appended claims.

I claim:

1. A wall mounted cabinet having a cabinet door and a mirror pivotally mounted to an interior surface of the door, said cabinet comprising:

a cabinet body having an internal storage area for receiving items to be stored and an opening for accessing said storage area;

a cabinet door for being pivotally mounted to said cabinet body, said cabinet door having an interior surface and an exterior surface;

first hinge means interconnected between said cabinet door and said cabinet body for allowing said cabinet door to pivot with respect to said cabinet body between a first position wherein said cabinet door is positioned proximate said opening and a second position wherein said cabinet door is positioned away from said opening;

a mirror directly pivotally mounted to the interior surface of said cabinet door, said mirror having a reflective first surface and a second surface; and a second hinge means interconnected between said mirror and said interior surface of said cabinet door for allowing said mirror to pivot with respect to said interior surface between a first position, wherein said second surface of said mirror is in proximate facing relationship with said cabinet door interior surface and extends generally parallel thereto and a second position wherein said second surface of said mirror is positioned away from said cabinet door interior surface whereby when said cabinet door and said mirror are in said first position, said mirror is out of view from the exterior of said cabinet and when said cabinet door and said mirror are in said second position said mirror is positionable such that said mirror can be viewed from the exterior of the cabinet.

2. The cabinet as recited in claim 1, wherein said cabinet door is generally planar, said mirror being transversely positioned with respect to said cabinet door when said mirror is in said second position.

3. The cabinet as recited in claim 1, wherein said second hinge means comprises a first hinge member secured to said interior door surface and a second hinge member secured to said second surface of said mirror, said first and second hinge members including cooperating pivot means for allowing said first hinge member to pivot with respect to said second hinge member.

4. The cabinet as recited in claim 3, wherein said second hinge member is adhesively secured to said second surface of said mirror and said first hinge member is adhesively secured to said interior door surface.

5. The cabinet as recited in claim 1, wherein said reflective first surface is a magnifying surface.

6. The cabinet as recited in claim 5, wherein said cabinet door has a proximal end and a distal end, said first hinge means being interconnected between said proximal end of said cabinet door and said cabinet body, said mirror being pivotably mounted to the interior surface of said cabinet door proximate said distal end thereof.

* * * * *